United States Patent [19]

Kirby

[11] 4,416,155

[45] Nov. 22, 1983

[54] ELECTRONIC NOISE DETECTORS

[75] Inventor: Raymond L. Kirby, Alabaster, Ala.

[73] Assignee: Buddy B. Simpson A/B Electronics, Woodland, Ala.

[21] Appl. No.: 349,622

[22] Filed: Feb. 17, 1982

[51] Int. Cl.$^3$ .................. G08B 21/00; G01H 9/00
[52] U.S. Cl. ................................. 73/646; 340/573
[58] Field of Search .............. 73/646, 647; 179/1 N; 340/573

[56] References Cited

U.S. PATENT DOCUMENTS

| | | | |
|---|---|---|---|
| 3,545,564 | 12/1970 | Barber | 179/1 N |
| 3,747,703 | 7/1973 | Knowd et al. | 179/1 N |
| 3,802,535 | 4/1974 | Peake et al. | 179/1 N |
| 4,257,273 | 3/1981 | Knowd | 73/647 |
| 4,307,385 | 12/1981 | Evans | 73/647 |
| 4,346,374 | 8/1982 | Groff | 179/1 N |

*Primary Examiner*—Howard A. Birmiel

[57] ABSTRACT

This electronic noise detector is an instructional device for classroom teachers to use in achieving academic excellence in educating students. Academic excellence is, among other things, dependent upon good discipline in the classroom and excessive noise in a classroom is disruptive of good discipline. This invention provides the classroom teacher with a means of immediately controlling the noise level in any classroom with any arrangement of the students. It further provides a means for instructing students to accept responsibility for maintaining a level of noise to the classroom which is conducive to achieving academic excellence.

Operation of the device is simple. The teacher places it any place in the classroom that may be desired and turns it on. The device is then in a monitoring mode. The teacher sets an adjustable gain control and predetermines a level of noise which will be unacceptable. The device monitors the classroom without further intervention of the teacher. When the noise level in the classroom exceeds the preset level for a continuous five seconds, the device enters its response mode and a buzzer sounds for approximately four seconds. The five second toleration period allows for unexpected noises such as sneezes, a book falling, etc., thus making the device a monitress of the average noise level in a classroom.

While the device is in its response mode, it automatically ceases to monitor the noise in the classroom, thus it cannot activate itself. As soon as the response mode ends, the device automatically reverts to a monitoring mode.

What is unique about this device is:
(a) it has a sensitivity range which makes it usable in an ordinary classroom,
(b) it can endure a preset level of sound for at least five seconds without entering the response mode,
(c) it automatically interrupts the monitoring mode and cannot self-activate the circuit,
(d) it automatically returns to a monitoring mode upon completion of its response mode,
(e) it can be used in any environment where students are being educated regardless of external power supplies, arrangements of students, or enlisting participation of the students in any particular fashion.

1 Claim, 1 Drawing Figure

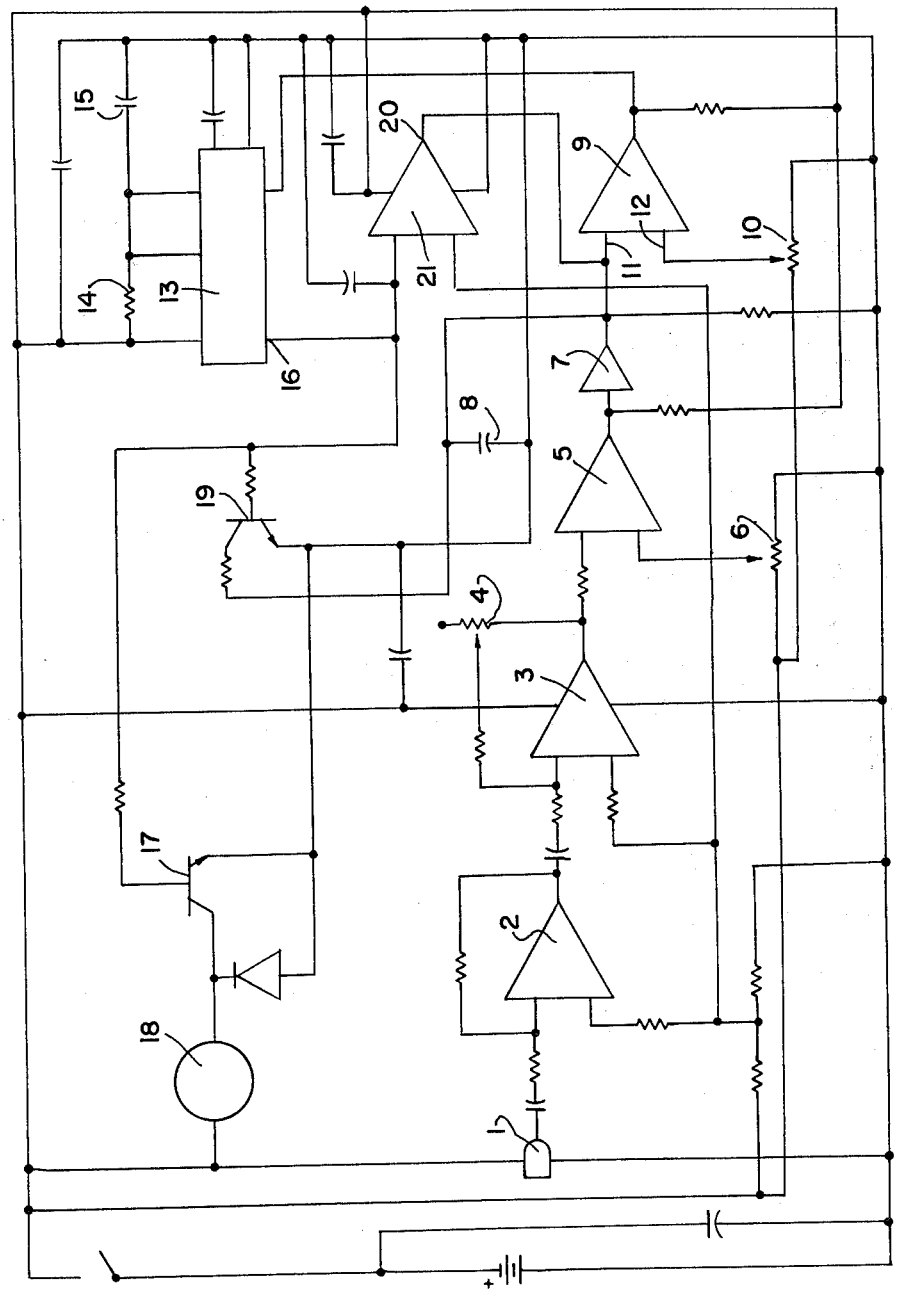

4,416,155

ELECTRONIC NOISE DETECTORS

BACKGROUND OF THE INVENTION

This invention is designed as an instructional device for classroom teachers to use in achieving academic excellence in the process of educating students. While academic excellence is dependent upon many factors, no one in the teaching profession would deny that good discipline is a vital factor. Likewise, educators recognize that controlling noise in the classroom is a major factor in maintaining good discipline. By invention provides a means for classroom teachers to control noise in the classroom immediately upon utilization of the device, and further, it provides a means whereby teachers can instruct the students to accept responsibility themselves for controlling noise in the classroom and keeping it below disruptive levels.

Prior-art means for monitoring noise created by students operate on the principle whereby audible sounds are used to activate circuits which will result in a visible or audible signal being given when the noise level being monitored reaches or exceeds a predetermined level.

Existing devices for monitoring noise created by students are not well designed for general classroom use and have many drawbacks.

One drawback is, with existing devices, students being monitored must be placed in specific physical positions to be monitored, i.e., arranged into a plurality of at least two spatially-located groups, or they must be seated facing forwardly in the passenger seat of a school bus.

Another drawback in existing devices is their utilization of other devices, such as radios and alternative couplings to loud speakers, which are not conducive to a good educational environment.

Yet another drawback in existing devices is, in their continuing operation they are dependent upon reset systems and a continuing controller who monitors the operation of the device.

Still another drawback in existing devices is, their effectiveness is dependent upon stressing togetherness within groups of students, promoting competition between groups of students, and/or enlisting the participation of students in a game like atmosphere.

And yet another drawback in existing devices is, they are not fully portable or usable in any location irregardless of the availability of an external power supply.

Still another drawback in existing devices is, when they detect noise which exceeds a predetermined decibel level of unacceptability for an academic environment, the noise triggers a timing cycle wherein said timing cycle becomes of primary importance, and any response of the device depends more on the occurrence and/or non-occurrence of noise at precise moments within the timing cycle, rather than the mere occurrence of noise. Thus the devices indicate an inability to distinguish between noises of different lengths of time with such being measured by the duration of the noise being monitored.

The purpose of my invention is to provide a device for the teaching profession which:

is fully automatic in its operation with the ability to switch from its monitoring to response to monitoring modes without necessity of manipulation by the controller;

is completely portable even to the extent that it can be carried in a lady's handbag;

is energized by an internal power supply;

does not require any special physical arrangement of students who are being monitored;

does not require any special participation of the students to be effective in its purpose;

does not require the assistance of any other device to adequately perform its function as a noise detector is fully capable of listening for noise, detecting noise, distinguishing between different decibel levels of noise, and distinguishing between noises of different lengths of time with such being measured by the duration of the noise being monitored, and to do same on a continuous non-stop basis while incorporating a time delay which prevents isolated incidents of noise from triggering the response mode, and to do same by requiring the presence of continuous noise to create and to sustain the time delay for varying lengths of time before the device can enter into its response mode.

BRIEF DESCRIPTION OF THE INVENTION

In educational environments, where some noise is either, necessary to the process, or, tolerated during the process, the natural tendency is for the noise level to rise. If the noise level is allowed to exceed certain levels, the educational process breaksdown and academic excellence cannot be achieved.

My electronic noise detector is a device which can be used to signal when noise has exceeded the acceptable level of noise as is determined by the classroom teacher. The device converts sound waves into a voltage potential. That signal is then passed through two stages of amplification where it is given both fixed and adjustable gains. It then passes through a series of three comparators where, (1) a sensitivity range for the device is established, (2) a threshold is set that allows the device to tolerate a given level of sound for a specified period of time before it goes into its response mode, and (3) a hold-off circuit is established which keeps the noise of the buzzer from reactivating the circuit, i.e., the monitoring mode is automatically interrupted while the device is in its reponse mode, but automatically returns to a monitoring mode when the response mode time has ended.

The entire circuit is housed in a plastic case with dimensions of 3.5 inches wide, 5 inches long, and 1.625 inches high. It is energized by a 9 volt dc battery and is controlled by a single knob which performs both, the off/on function, and the setting of a predetermined level of unacceptable noise.

BRIEF DESCRIPTION OF THE DRAWING

The drawing is a detailed schematic diagram of the electronic circuitry of the device.

DETAILED DESCRIPTION

When the device is in its monitoring mode, a microphone 1 is used to detect noise made by students. Those sound waves are converted into a voltage potential with the amplitude being determined by the sound level being monitored. The audio signal is passed through a simple inverting amplifier 2 where it is given a fixed gain. The amplified signal is passed through a second simple inverting amplifier 3 where it is given an adjustable gain by means of a linear taper potentiometer 4 thus allowing the operator to select any noise decibel level within a fifty (50) decibel range with the upper limit of said range being one hundred (100) decibels or more, and the lower limit of said range being forty (40) decibels, or less. Next the signal is sent to a voltage comparator 5 which has an internal bias adjustment by means of a trimmer potentiometer 6, which allows the fifty (50) decibel sensitivity range of the device to be set, to be raised or to be lowered as may be required for satisfactory operation in a classroom, where forty (40) to ninety (90) decibels is considered optimum. A filter is formed by diode 7 and a capacitor 8 to convert the ac signal from the comparator 5 to a dc level. When comparator 5 sends a signal through diode 7, the charge is stored by capacitor 8 until the voltage potential of input pin 11 of comparator 9 equals or exceeds the voltage of input pin 12 of said comparator, with said voltage of input pin 12 being set by trimmer potentiometer 10. Thus by raising or lower the voltage level of said input pin 12, a threshold can be set and/or varied to require the presence of continuous noise for any time span ranging from a few micro-seconds to as much as seven full seconds to charge capacitor 8 to the point that its potential, equals or exceeds the threshold set by input pin 12, which is required to put the device into its response mode.

When the device is in its response mode, a resistor 14 and a capacitor 15 form a time constant to control the length of time the device will remain in a response mode. During that time, the output pin 16 of the multivibrator 13 is conducting and causes an NPN transistor 17 to conduct thus allowing the buzzer 18 to sound. During that same time, another NPN transistor 19 conducts and holds down the output pin 20 of the hold-off comparator 21 thus interrupting the monitoring ability of the device and thereby preventing the sound of the buzzer 18 from causing self-activation of the circuit. The output pin 20 of the hold-off comparator 21 is held down until the buzzer 18 is completely silenced. Then, when the NPN transistor 19 ceases to conduct, the device automatically reverts to its monitoring mode.

What is claimed is:

1. An electronic noise detector device with a monitoring mode and a response mode, the device when in its monitoring mode having the ability to listen for noise, to detect noise, to distinguish between noise of different lengths of time with such being measured by the duration of the noise being monitored, and to respond to noises of different decibel levels and different lengths of duration by triggering a response mode of the device, and to do same on a continuous non-stop basis in a manner so that noises which exceed the predetermined decibel level but which are shorter in length than a predetermined time of diration will not trigger the response mode of the device; and when in its response mode, after being triggered by the monitoring mode, having the ability to sound an audible alarm for varying lengths of time, while simultaneously interrupting the monitoring mode of the device to prevent said monitoring mode of the device from responding to the noise created by the audible alarm of said response mode, even though said alarm of the response mode does exceed the predetermined decibel level of unacceptability for an academic environment, and even though said alarm does exceed the predetermined length of time as measured by its duration, the interruption being such as to prevent the device from retriggering the response mode of the device and thereby prevent the device from going into an endless cycle of alarms, said device comprising:

(a) means for converting sound waves into a voltage potential signal, (b) means for inverting and amplification of the signal at a fixed gain, (c) means for inverting and amplification of the signal with an adjustable gain, (d) means for setting the device to response to noise in the range of 40 db to 90 db, (e) means for setting a threshold level which allows monitoring of a given sound level for a time period of up to five seconds without triggering the response mode, (f) means for automatically interrupting the monitoring mode when the device is in a response mode, and (g) means for automatically returning the device to a monitoring mode upon completon of the response mode.

* * * * *